(12) United States Patent
Bito

(10) Patent No.: US 9,221,345 B2
(45) Date of Patent: Dec. 29, 2015

(54) BATTERY CHARGING DEVICE FOR MOTOR VEHICLE

(71) Applicant: SUZUKI MOTOR CORPORATION, Shizuoka (JP)

(72) Inventor: Seiji Bito, Shizuoka (JP)

(73) Assignee: SUZUKI MOTOR CORPORATION, Shizuoka (JP)

( * ) Notice: Subject to any disclaimer, the term of this patent is extended or adjusted under 35 U.S.C. 154(b) by 183 days.

(21) Appl. No.: 14/096,154

(22) Filed: Dec. 4, 2013

(65) Prior Publication Data

US 2014/0184142 A1      Jul. 3, 2014

(30) Foreign Application Priority Data

Dec. 28, 2012   (JP) .................................. 2012-287803

(51) Int. Cl.
*H02J 7/00*          (2006.01)
*H02J 7/14*          (2006.01)
(Continued)

(52) U.S. Cl.
CPC . *B60L 7/14* (2013.01); *B60L 11/14* (2013.01); *B60L 11/1861* (2013.01); *B60L 11/1864* (2013.01); *B60L 11/1868* (2013.01); *B60L 2210/10* (2013.01); *B60L 2210/40* (2013.01); *B60L 2240/547* (2013.01); *B60L 2240/549* (2013.01); *Y02T 10/70* (2013.01); *Y02T 10/7005* (2013.01); *Y02T 10/7016* (2013.01); *Y02T 10/7044* (2013.01); *Y02T 10/7061* (2013.01); *Y02T 10/7066* (2013.01);
(Continued)

(58) Field of Classification Search
CPC ... Y02T 10/7005; Y02T 90/14; Y02T 10/705; Y02T 10/7088; Y02E 60/12; G01R 31/3658; H02J 7/0021; H02J 7/0022; H02J 7/0024
USPC ......................................................... 320/104
See application file for complete search history.

(56) References Cited

U.S. PATENT DOCUMENTS

2007/0080662 A1\*   4/2007   Wu ........................ B60L 3/0046
                                                                 320/110
2008/0258683 A1\*  10/2008   Chang ................. H01M 10/441
                                                                 320/112
(Continued)

FOREIGN PATENT DOCUMENTS

CN          101580030 A       11/2009
JP          2007-307931 A     11/2007
(Continued)

OTHER PUBLICATIONS

The First Office Action mailed Jun. 24, 2015 in corresponding Chinese Patent Application No. 201310654527.1 (with an English translation) (15 pages).

*Primary Examiner* — Arun Williams
(74) *Attorney, Agent, or Firm* — Rothwell, Figg, Ernst & Manbeck, P.C.

(57) ABSTRACT

A battery charging device for a motor vehicle capable of enabling the charging of a low voltage battery by a high voltage battery, without using a transformer such as a DC/DC converter, is disclosed. A battery pack 30 has a plurality of battery modules 31 having an output equivalent to a lead battery 5, a parallel circuit 39 for connecting the plurality of battery modules 31 in parallel, and a series circuit 34 for connecting the plurality of battery modules 31 in series, and the lead battery 5 is connected to the parallel circuit 39 in parallel with the plurality of battery modules 31.

10 Claims, 8 Drawing Sheets

(51) Int. Cl.
  *B60L 7/14*      (2006.01)
  *B60L 11/14*     (2006.01)
  *B60L 11/18*     (2006.01)
(52) U.S. Cl.
  CPC ......... *Y02T 10/7077* (2013.01); *Y02T 10/7216* (2013.01); *Y02T 10/7241* (2013.01)

(56) References Cited

U.S. PATENT DOCUMENTS

| | | | | |
|---|---|---|---|---|
| 2009/0009178 | A1* | 1/2009 | Okamoto | G01R 31/3658 324/434 |
| 2009/0016021 | A1 | 1/2009 | Kim et al. | |
| 2009/0206660 | A1 | 8/2009 | Makita et al. | |
| 2009/0251103 | A1* | 10/2009 | Yamamoto | B60K 6/48 320/133 |
| 2010/0001737 | A1* | 1/2010 | Kubo | B60L 11/18 324/434 |
| 2010/0327878 | A1* | 12/2010 | Ishikawa | B60L 11/14 324/537 |
| 2012/0001480 | A1* | 1/2012 | Favaretto | B60K 6/48 307/9.1 |

FOREIGN PATENT DOCUMENTS

| | | |
|---|---|---|
| JP | 2008-52997 A | 3/2008 |
| JP | 2009-18785 A | 1/2009 |
| JP | 2010-162996 A | 7/2010 |
| JP | 2011-172341 A | 9/2011 |

\* cited by examiner

| LEAD BATTERY VOLTAGE | CHARGING CURRENT |
|---|---|
| 12.4V OR LESS | (BATTERY PACK CHARGING REQUEST) |
| 12.6V OR LESS | 0.5A OR LESS |
| 12.8V OR LESS | 1.0A OR LESS |
| 13.0V OR LESS | 2.0A OR LESS |
| 14.0V OR LESS | 3.0A OR LESS |

BATTERY CHARGING DEVICE FOR MOTOR VEHICLE

CROSS REFERENCE TO RELATED APPLICATION

This application claims priority to Japanese Application Number 2012-287803, filed Dec. 28, 2012, the entire content of which is hereby incorporated by reference.

FIELD OF THE INVENTION

The present invention relates to a battery charging device for a motor vehicle that charges a battery of a motor vehicle that is driven by using an electric power.

BACKGROUND OF THE INVENTION

In the hybrid electric motor vehicle (HEV), as disclosed in Japanese Patent Application Publication No. 2010-162996 and Japanese Patent Application Publication No. 2007-307931, in general, a high voltage supplied from a high voltage battery is lowered to about 14V by using a DC/DC converter and charged into a low voltage battery, and a power is supplied from this low voltage battery to 12V system equipments (low voltage system equipments).

Also, the DC/DC converter generates heat at a time of lowering a high voltage to a low voltage and charging it into the low voltage battery. For this reason, there is a need to cool the DC/DC converter. In order to cool the DC/DC converter, an accessory such as a fan for sending cooling air to the DC/DC converter is used.

However, when the accessory such as a fan is used for the purpose of the cooling, the DC/DC converter itself becomes large in size, and the accessory such as a fan for cooling the DC/DC converter is to be provided separately, besides accessories for cooling heat generators other than the DC/DC converter, such as a battery pack and other heat generating components, and the respective equipments are to be cooled by providing a plurality of accessories in the motor vehicle, so that the efficiency of the cooling is poor as a whole.

Also, the accessory for cooling the DC/DC converter is to be provided besides the accessories for cooling the battery pack and the other heat generating components, so that a wide space for arranging a plurality of accessories is required.

For this reason, in Japanese Patent Application Publication No. 2008-52997 and Japanese Patent Application Publication No. 2009-18785, there has been a proposition for achieving a down sizing of the DC/DC converter and an improved efficiency of the cooling, by sharing paths for cooling the battery pack and the other heat generating components and the DC/DC converter. In Japanese Patent Application Publication No. 2008-52997 and Japanese Patent Application Publication No. 2009-18785, it is possible to cool the DC/DC converter and the battery pack and the other heat generating components by one accessory for cooling, so that the efficiency of the cooling is good, and a space for respectively arranging a plurality of accessories for cooling is unnecessary, so that it is possible to realize the down sizing of the DC/DC converter itself.

As described above, in Japanese Patent Application Publication No. 2008-52997 and Japanese Patent Application Publication No. 2009-18785, it is possible to achieve the down sizing of the DC/DC converter, the improved efficiency of the cooling, and the saving of the arrangement space, by sharing the cooling paths with the battery pack and the other heat generating components for the purpose of cooling the DC/DC converter. However, there are cases where the timings for generating heat are different depending on the usage situations and the like for the DC/DC converter and the battery pack and the other heat generating components. For this reason, the timings at which the cooling of the DC/DC converter is required and the timings at which the cooling of the battery pack and the other heat generating components is required are different. In this case, the DC/DC converter is going to be cooled in order to cool the other heat generating components, even when there is no need to cool the DC/DC converter, so that the efficiency of the cooling is poor.

Also, in order to further increase the cooling effect of the DC/DC converter, if the number of fans for sending air is increased, the device including the DC/DC converter as a whole will become large in size, and it is difficult to realize the down sizing. Also, if the number of fans for sending air is increased, it will become necessary to secure a large arrangement space for arranging a plurality of fans.

Consequently, in the hybrid electric motor vehicle, when the DC/DC converter is used at a time of lowering a high voltage to a low voltage and charging it into the low voltage battery, it is difficult to cool efficiently, and there has been a need to secure a space for arranging accessories for cooling the DC/DC converter, in addition to a space for arranging the DC/DC converter.

SUMMARY OF THE INVENTION

The object of the present invention is to enable the charging of a low voltage battery by a high voltage battery, without using a transformer such as a DC/DC converter.

In order to solve the problems described above, (1) one form of the present invention provides a battery charging device for a motor vehicle that controls a charging of a low voltage battery, comprising: a low voltage battery that is a power source of low voltage system equipments, a driving motor that drives driving wheels, and a battery pack that is a power source of said driving motor, which has a plurality of battery modules having an output equivalent to said low voltage battery, a low voltage circuit for connecting said plurality of battery modules in parallel, and a high voltage circuit for connecting said plurality of battery modules in series, wherein said low voltage battery is connected to the low voltage circuit in parallel with said plurality of battery modules.

(2) In one form of the present invention, it is preferable for said low voltage circuit to have elements for flowing currents in one direction from said battery modules toward said low voltage battery.

(3) In one form of the present invention, it is preferable to further comprise a voltage detection unit for detecting a voltage on said low voltage circuit, and a charging control unit for carrying out the charging of said low voltage battery by using a power of said battery pack, when a voltage value detected by said voltage detection unit is greater than a voltage judgment threshold that is set in advance.

(4) In one form of the present invention, it is preferable to further comprise an engine for carrying out a power generation by driving said driving motor, and a SOC calculation unit for calculating a SOC (State Of Charge) of said battery pack, wherein said charging control unit charges at least one of said low voltage battery and said battery pack by a power generated by said engine, when the voltage value detected by said voltage detection unit is less than or equal to said voltage judgment threshold, or the SOC calculated by said SOC calculation unit is less than a SOC judgment threshold that is set in advance.

(5) In one form of the present invention, it is preferable to further comprise an intention for acceleration judgment unit for judging an intention for acceleration of said motor vehicle by a driver, wherein said charging control unit charges at least one of said low voltage battery and said battery pack by a regenerative power of said driving motor, when said intention for acceleration judgment unit judges that said intention for acceleration is absent.

According to the invention in form of (1), the plurality of battery modules within the battery pack have an output equivalent to the low voltage battery, and these are connected in parallel, and further the plurality of battery modules and the low voltage battery are connected in parallel. By means of this, the battery charging device for the motor vehicle can charge the low voltage battery by utilizing the battery modules within the battery pack, without using a transformer such as a DC/DC converter. Consequently, a space for arranging the DC/DC converter becomes unnecessary, and there is no need to secure an arrangement space for accessories and the like for cooling the DC/DC converter.

According to the invention in form of (2), by making the currents to flow from the battery modules toward the low voltage battery in one direction, the battery charging device for the motor vehicle can charge the low voltage battery by utilizing the power of the battery modules. Also, the battery charging device for the motor vehicle can prevent a voltage dropping or an excessive discharging of the low voltage battery by preventing the charging of the battery modules by the low voltage battery.

According to the invention in form of (3), the battery charging device for the motor vehicle can charge the low voltage battery by using the power of the battery pack until it becomes fully charged. Also, the voltage value of the battery pack can be detected by the voltage detection unit, so that the battery charging device for the motor vehicle can charge the low voltage battery according to that voltage value of the battery pack.

According to the invention in form of (4), in the case where there is a need to charge the low voltage battery or the battery pack, the battery charging device for the motor vehicle can charge the low voltage battery or the battery pack by driving the engine.

According to the invention in form of (5), the battery charging device for the motor vehicle can charge the low voltage battery or the battery pack by the regenerative power of the driving motor in the case where the intention for acceleration by the driver is absent.

DETAILED DESCRIPTION OF THE INVENTION

The embodiments of the present invention will be described with references to the drawings.

In the present embodiment, a hybrid motor vehicle on which a battery charging device is mounted will be described.

(Configuration)

Figure 1:
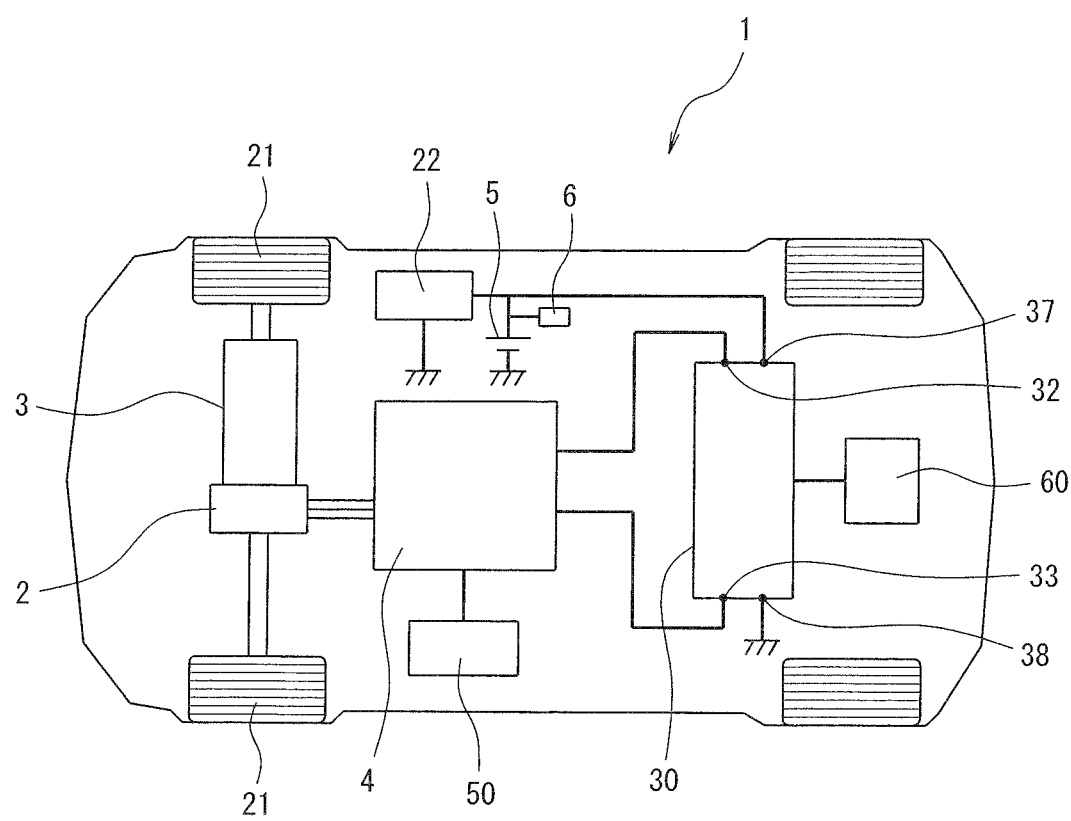
FIG. 1 is a diagram showing an exemplary configuration of a hybrid motor vehicle according to the present embodiment.

In FIG. 1, an exemplary configuration of a hybrid motor vehicle 1 according to the present embodiment is shown.

As shown in FIG. 1, the hybrid motor vehicle 1 has a driving motor 2, an engine 3, an inverter 4, a 12V lead battery (i.e., a low voltage battery) 5, a battery voltage sensor 6, a battery pack (i.e., a high voltage battery) 30, a motor vehicle controller 50, and a battery controller 60.

The driving motor 2 is connected to driving wheels 21, and drives the driving wheels 21 by a power supplied. Also, the driving motor 2 is also capable of carrying out a power generation by being driven by the engine 3. The engine 3 is an internal combustion engine, for example.

The inverter 4 carries out a power running control and a regenerative control of the driving motor 2. At a time of the power running control, the inverter 4 drives the driving motor 2 by a power supplied from the battery pack 30. This inverter 4 is controlled by the motor vehicle controller 50. Also, the battery pack 30 is controlled by the battery controller 60.

The motor vehicle controller 50 controls the driving of the driving motor 2 and the engine 3. The motor vehicle controller 50 and the battery controller 60 are configured in an ECU (Electronic Control Unit) equipped with a microcomputer and its peripheral circuits. For this reason, the motor vehicle controller 50 and the battery controller 60 are configured by CPU, ROM, RAM and the like, for example. In ROM, one or two or more programs are stored. CPU executes various types of processings according to one or two or more programs stored in ROM.

The lead battery 5 mainly supplies a power to 12V loads (for example, low voltage system equipments) 22. This lead battery 5 is electrically connected with the battery pack 30 so that a power will be supplied from the battery pack 30.

Figure 2:
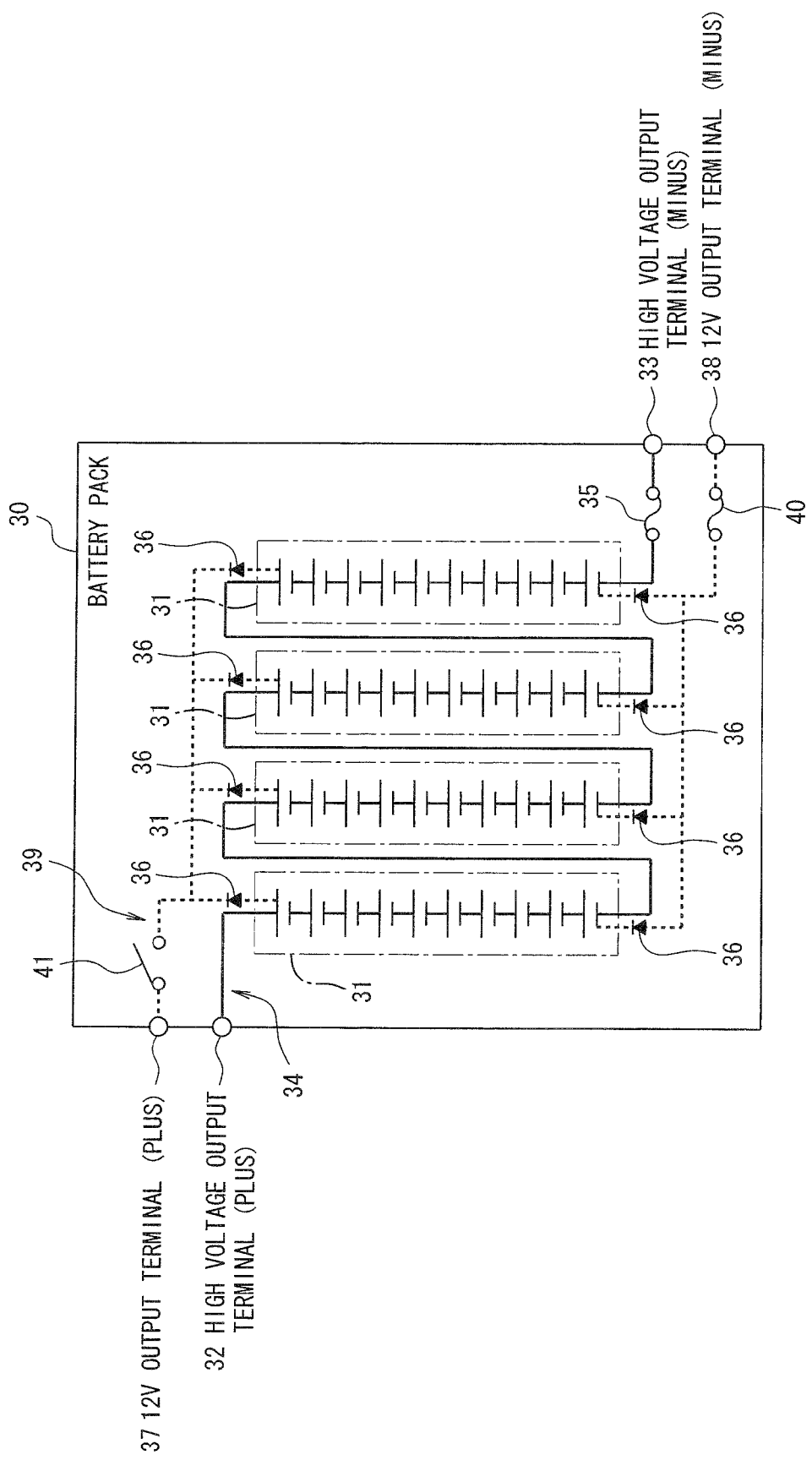
FIG. 2 is a diagram showing an exemplary configuration of a battery pack.

Here, in FIG. 2, an exemplary configuration of the battery pack 30 is shown.

As shown in FIG. 2, the battery pack 30 has a plurality of battery modules 31. Each battery module 31 has a type of battery and a number of cells of a unit cell battery selected such that it has a voltage range (an output range) of 10V to 15V. Here, as a type of battery, a nickel metal hydride battery, a lithium battery and the like can be contemplated. For example, each battery module 31 is configured by connecting ten cells of a unit cell battery comprising a nickel metal hydride battery cell (a battery cell that is usable at 1.0V to 1.6V) in series.

The battery pack 30 has a plurality of such battery modules 31 connected in series, as indicated by solid lines in FIG. 2. Then, in the battery pack 30, respective output terminals (a plus terminal, a minus terminal) to which the plurality of battery modules 31 are connected in series are provided as high voltage terminals 32 and 33. Also, in a series circuit 34 formed by having the plurality of battery modules 31 connected in series, a high voltage fuse 35 is provided.

Also, the battery pack 30 has the plurality of battery modules 31 connected in parallel, as indicated by dashed lines in FIG. 2. In other words, the battery pack 30 has a circuit for connecting the plurality of battery modules 31 in series and a circuit for connecting the plurality of battery modules 31 in parallel.

Then, in the battery pack 30, respective output terminals (a plus terminal, a minus terminal) to which the plurality of battery modules 31 are connected in parallel are provided as low voltage terminals 37 and 38. Here, in a parallel circuit 39 formed by having the plurality of battery modules 31 connected in parallel, a low voltage fuse 40 is provided. Furthermore, in the parallel circuit 39, a charging switch 41 capable of turning the parallel connection of the plurality of battery modules 31 ON and OFF is provided. By means of this, when the charging switch 41 is turned ON and OFF, the output from the low voltage terminals 37 and 38 due to the parallel circuit 39 will be turned ON and OFF.

Furthermore, in the parallel circuit 39, large capacity diodes 36 for backflow prevention are provided for each battery module 31. Here, the diodes 36 function as elements for flowing currents in one direction from the battery modules 31 toward the lead battery 5.

The lead battery 5 is electrically connected to the low voltage terminals 37 and 38 such that it becomes parallel to this parallel circuit 39 (that is, each battery module 31 that is connected in parallel).

The battery voltage sensor 6 is arranged on a circuit to which the lead battery 5 and the parallel circuit 39 of the battery pack 30 are electrically connected. In the present embodiment, as shown in FIG. 1, the battery voltage sensor 6 is arranged near the lead battery 5. This battery voltage sensor 6 outputs a detected voltage value to the battery controller 60.

Next, the battery charging device for the motor vehicle that is mounted on the hybrid motor vehicle 1 described above will be described. Note that the same constituent elements as in the configuration described for the hybrid motor vehicle 1 described above will be described by assigning the same reference numerals.

The battery charging device for the motor vehicle according to the present embodiment controls the charging of the low voltage battery 5 of the motor vehicle 1 having the low voltage battery 5 that is a power source of low voltage system equipments, the driving motor 2 that drives the driving wheels 21, and the battery pack 30 that is a power source of the driving motor 2.

Also, the battery charging device for the motor vehicle of the present embodiment is configured by the lead battery (that is, the low voltage battery) 5 of 12V, the battery pack 30, the motor vehicle controller 50, and the battery controller (the charging control unit) 60, that are mounted on the motor vehicle 1.

As described above, the battery pack 30 has the plurality of battery modules 31 that have the output equivalent to the low voltage battery 5, the low voltage circuit 39 that connects the plurality of battery modules 31 in parallel, and the high voltage circuit 34 that connects the plurality of battery modules 31 in series, and the low voltage battery 5 is connected to the low voltage circuit 39 in parallel with the plurality of battery modules 31.

Next, a battery control to be carried out by the battery controller (the charging control unit) 60 in the present embodiment will be described.

Figure 3:
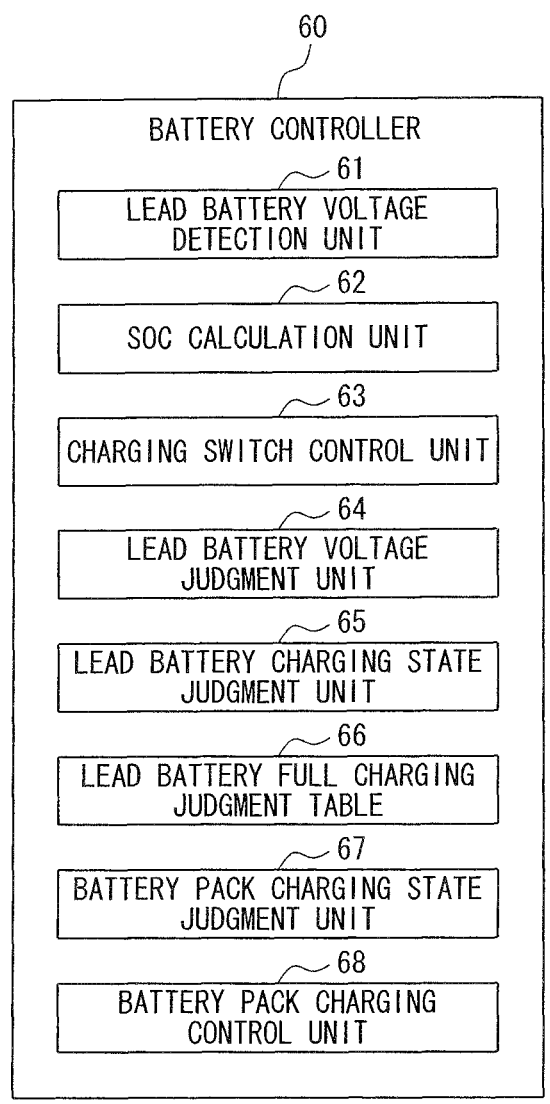
FIG. 3 is a block diagram showing an exemplary configuration of a battery controller.

In FIG. 3, an exemplary configuration of the battery controller 60 for realizing the battery control in the present embodiment is shown. As shown in FIG. 3, the battery controller 60 has a lead battery voltage detection unit (a voltage detection unit) 61, a SOC calculation unit 62, a charging switch control unit 63, a lead battery voltage judgment unit 64, a lead battery charging state judgment unit 65, a lead battery full charging judgment table 66, a battery pack charging state judgment unit 67, and a battery pack charging control unit 68.

Figure 4:
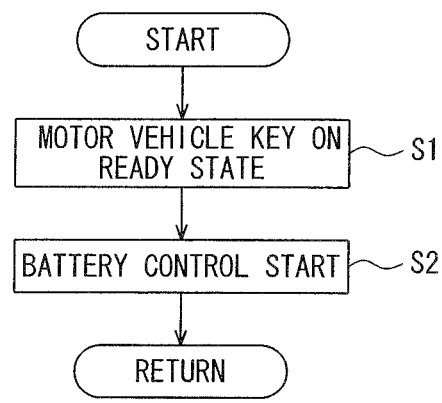
FIG. 4 is a flow chart showing an exemplary processing at a time of starting a battery control.
Figure 5:
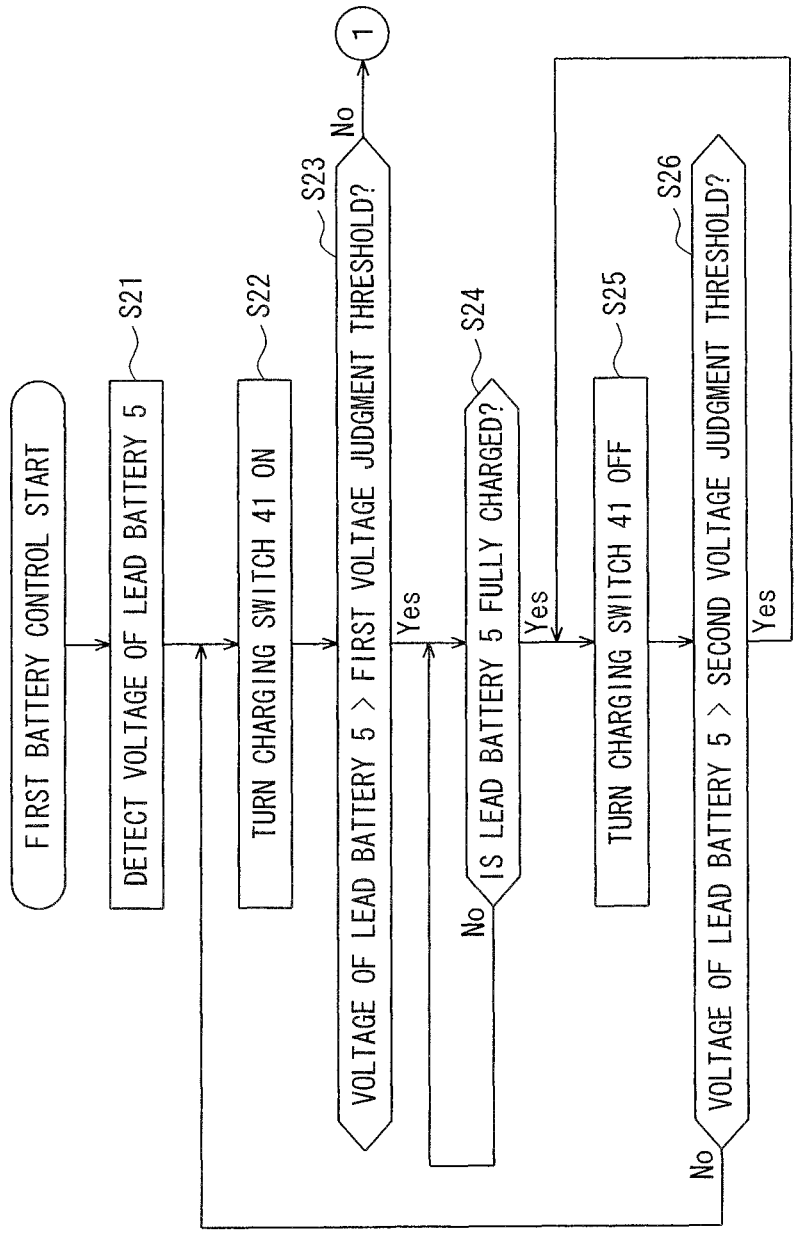
FIG. 5 is a flow chart showing an exemplary processing of a first battery control (mainly a charging control of a lead battery).
Figure 6:
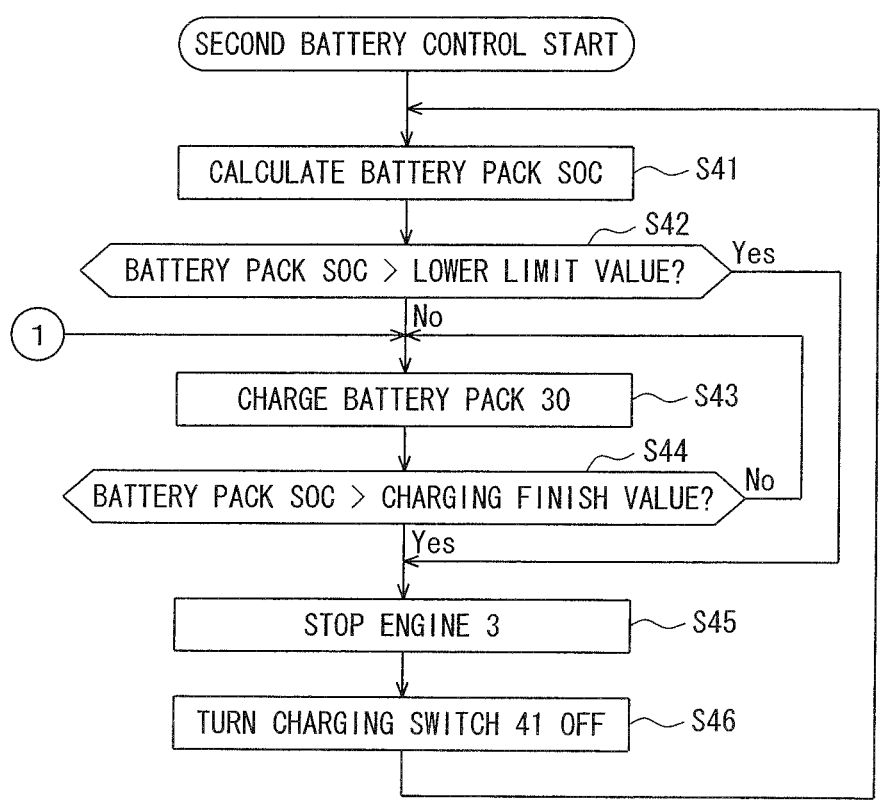
FIG. 6 is a flow chart showing an exemplary processing of a second battery control (mainly a charging control of a battery pack).

Also, in FIG. 4 to FIG. 6, the flow charts of an exemplary processing for the battery control to be carried out by the battery controller 60 are shown. Here, FIG. 4 is a flow chart showing an exemplary processing at a time of starting the battery control. Also, FIG. 5 is a flow chart showing an exemplary processing of a first battery control (mainly a charging control of the lead battery 5) that is started by the processing of FIG. 4. Also, FIG. 6 is a flow chart showing an exemplary processing of a second battery control (mainly a charging control of the battery pack 30) that is started by the processing of FIG. 4. In the following, the processing content of each unit of the battery controller 60 shown in FIG. 3 will be described concretely, along the processing procedure shown in FIG. 4 to FIG. 6.

First, using FIG. 4, the exemplary processing at a time of starting the battery control will be described.

As shown in FIG. 4, when the key of the motor vehicle is positioned at an ON position so that the motor vehicle becomes a key turned ON (a key is turned ON) and it becomes a READY state, the battery controller 60 starts the battery control (step S1, step S2). By this start of the battery control, the first battery control shown in FIG. 5 and the second battery control shown in FIG. 6 are respectively started.

As shown in FIG. 5, in the first battery control, first, at the step S21, the lead battery voltage detection unit 61 detects a voltage of the lead battery 5 based on the detected voltage value of the battery voltage sensor 6. A detection signal of the detected voltage is transmitted to the battery controller 60.

Next, at the step S22, the charging switch control unit 63 turns the charging switch 41 ON. By means of this, the parallel circuit 39 of the battery pack 30 becomes effective (that is, a state of being connected with the low voltage battery 5), such that the power from that parallel circuit 39 will be supplied to the lead battery 5 via the low voltage terminals 37 and 38 of the battery pack 30.

Next, at the step S23, the lead battery voltage judgment unit 64 judges whether the voltage of the lead battery 5 detected at the step S21 described above is greater than a first voltage judgment threshold or not. Here, the first voltage judgment threshold is a value that is set in advance experimentally, empirically or theoretically, for example. For instance, in the present embodiment, the first voltage judgment threshold is 12.4V, in correspondence to the fact that the output voltage of the lead battery 5 is 12V.

Then, when the lead battery voltage judgment unit 64 judges that the voltage of the lead battery 5 is greater than the first voltage judgment threshold, it proceeds to the step S24. Also, when the lead battery voltage judgment unit 64 judges that the voltage of the lead battery 5 is less than or equal to the first voltage judgment threshold, it proceeds to the step S43 shown in the flow chart of FIG. 6.

At the step S24, the lead battery charging state judgment unit 65 judges whether the lead battery 5 is fully charged or not. For example, in the present embodiment, the lead battery charging state judgment unit 65 judges whether the lead battery 5 is fully charged or not by using the lead battery full charging judgment table 66 in which the voltage of the lead battery 5 and the charging current are set in correspondence.

Figures 7, 8:
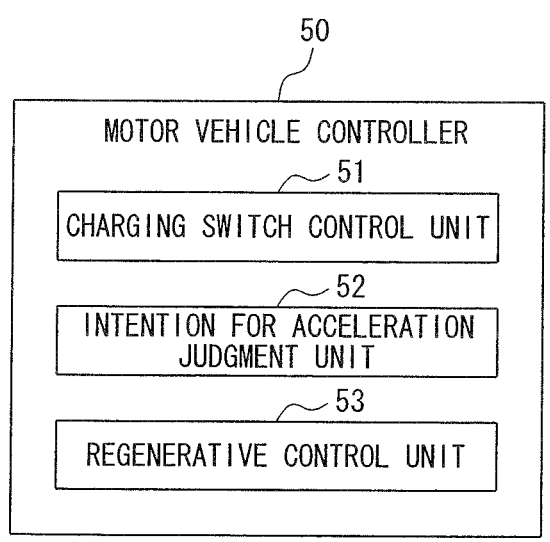
FIG. 7 is a diagram showing one example of a lead battery full charging judgment table.
FIG. 8 is a block diagram showing an exemplary configuration of a motor vehicle controller.

FIG. 7 is a diagram showing one example of the lead battery full charging judgment table 66.

As shown in FIG. 7, as the voltage of the lead battery 5 becomes larger, the charging current that is set in correspondence to that becomes larger. Namely, if the current value of the charging current that flows from the battery pack 30 to the lead battery 5 has been lowered to the charging current value corresponding to the voltage of the lead battery 5 shown in the lead battery full charging judgment table 66 shown in FIG. 7, it can be judged as fully charged, and if it has not been lowered, it can be judged as not fully charged.

In the present embodiment, in the case where the voltage of the lead battery 5 is judged to be greater than 12.4V at the step S23 described above, the lead battery charging state judgment unit 65 judges that the lead battery 5 is fully charged, if it is less than or equal to the charging current corresponding to that voltage of the lead battery 5 (for example, the charging current is 0.5 A or less if the lead battery voltage is less than or equal to 12.6V (that is, between 12.4V and 12.6V)), by referring to the lead battery full charging judgment table 66. Then, when the lead battery charging state judgment unit 65 judges that the lead battery 5 is fully charged, it proceeds to the step S25.

At the step S25, the charging switch control unit 63 turns the charging switch 41 OFF. By turning the charging switch 41 OFF, the parallel circuit (the low voltage circuit) 39 of the lead battery 5 and the battery pack 30 is shut off, and the charging state is released.

Next, at the step S26, the lead battery voltage judgment unit 64 judges whether the immediately previous voltage of the lead battery 5 is greater than a second voltage judgment threshold or not. Here, the second voltage judgment threshold is a value smaller than the first voltage judgment threshold. This second voltage judgment threshold is a value that is set in advance experimentally, empirically or theoretically, for example. In the present embodiment, the second voltage judgment threshold is 12.2V, for instance.

Then, when the lead battery voltage judgment unit 64 judges that the voltage of the lead battery 5 is greater than the second voltage judgment threshold, it starts the processing again from the step S25. Also, when the lead battery voltage judgment unit 64 judges that the voltage of the lead battery 5 is less than or equal to the second voltage judgment threshold, it starts the processing again from the step S22 described above.

On the other hand, as shown in FIG. 6, in the second battery control, first, at the step S41, the SOC calculation unit 62 calculates a SOC (State Of Charge: an index indicating the charging rate) of the battery pack 30. In the following, the SOC of the battery pack 30 will be referred to as a battery pack SOC.

For example, the SOC calculation unit 62 calculates the SOC ($SOC_n$) by using the equation (1) described below.

$$SOC_n = SOC_{n-1} + i \times (t/3600)/Fc \times 100 \quad (1)$$

Here, $SOC_n$ is a current SOC. Also, $SOC_{n-1}$ is a previous SOC (SOC calculated previously). Also, i is a battery pack current (A). Also, t is a time (h). Also, Fc is a battery pack capacity (Ah).

Next, at the step S42, the battery pack charging state judgment unit 67 judges whether the battery pack SOC calculated at the step S41 described above is greater than a lower limit value or not. Here, the lower limit value is a lower limit value of the charging rate for which the charging of the battery pack 30 becomes necessary. This lower limit value is a value that is set in advance experimentally, empirically or theoretically, for example. For instance, the lower limit value becomes 30% in terms of the SOC value.

Then, when the battery pack charging state judgment unit 67 judges that the battery pack SOC is greater than the lower limit value, it proceeds to the step S45. Also, when the battery pack charging state judgment unit 67 judges that the battery pack SOC is less than or equal to the lower limit value, it proceeds to the step S43.

At the step S43, the battery pack charging control unit 68 charges the battery pack 30. To this end, for example, the battery pack charging control unit 68 transmits a charging command for charging the battery pack 30 to the motor vehicle controller 50. By means of this, the motor vehicle controller 50 generates the power by driving the engine 3 while controlling the driving motor 2 and the inverter 4, and charges the battery pack 30 by the generated power.

Next, at the step S44, the battery pack charging state judgment unit 67 judges whether the battery pack SOC that is raised by the charging of the step S43 described above is greater than a charging finish value or not. Here, the charging finish value is a value larger than the lower limit value. The charging finish value is a value that is set in advance experimentally, empirically or theoretically, for example. For instance, the charging finish value becomes 80% in terms of the SOC value.

Then, when the battery pack charging state judgment unit 67 judges that the battery pack SOC is greater than the charging finish value, it proceeds to the step S45. Also, when the battery pack charging state judgment unit 67 judges that the battery pack SOC is less than or equal to the charging finish value, it starts the processing again from the step S43 (that is, it continues the charging of the battery pack 30).

At the step S45, the battery pack charging control unit 68 transmits a charging stop command for stopping the charging to the motor vehicle controller 50. When a signal of the charging stop command from the battery pack charging control unit 68 is received, the motor vehicle controller 50 stops the driving of the engine 3, and stops the power generation by the driving motor 2.

Next, after the power generation by the driving motor 2 is stopped, the charging switch control unit 63 turns the charging switch 41 OFF at the step S46, and the battery pack 30 and the lead battery 5 are shut off. Then, it starts the processing again from the step S41 described above, when the battery control is started and the second battery control is started.

The first battery control and the second battery control described above are started at the same time as the battery control is started, and their operations are linked by the mutual states.

Next, the regenerative control to be carried out by the motor vehicle controller 50 in the present embodiment will be described.

FIG. 8 shows an exemplary configuration of the motor vehicle controller 50 for realizing the regenerative control in the present embodiment. As shown in FIG. 8, the motor vehicle controller 50 has a charging switch control unit 51, an intention for acceleration judgment unit 52, and a regenerative control unit 53.

Figure 9:
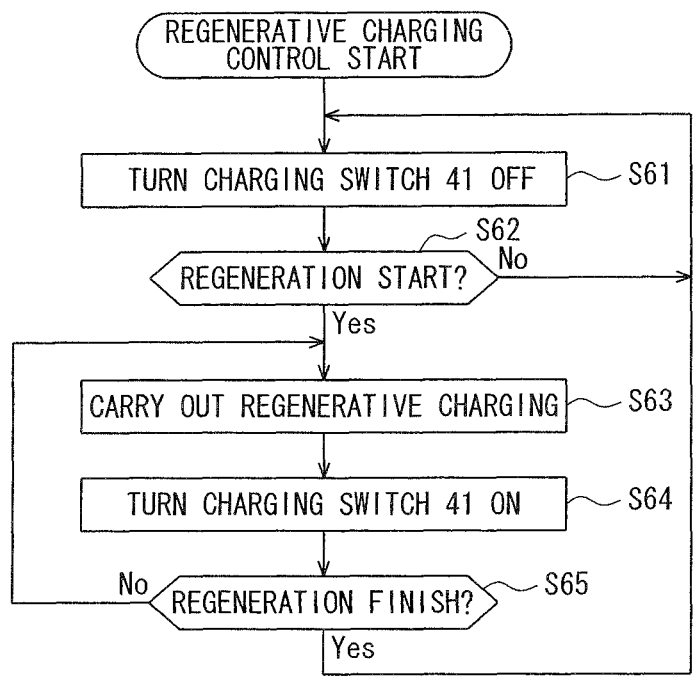
FIG. 9 is a flow chart showing an exemplary processing for a regenerative control to be carried out by a motor vehicle controller.

Also, FIG. 9 shows the flow chart of an exemplary processing for the regenerative control to be carried out by the motor vehicle controller 50. In the following, the processing content of each unit of the motor vehicle controller 50 shown in FIG. 8 will be described concretely, along the processing procedure shown in FIG. 9.

As shown in FIG. 9, first, at the step S61, the charging switch control unit 51 turns the charging switch 41 OFF.

At the step S62, the regenerative control unit 53 judges whether the regeneration is to be started or not. To be concrete, the regenerative control unit 53 judges that the regeneration is to be started, when the intention for acceleration judgment unit 52 judges that the intention for acceleration of the motor vehicle by the driver is absent. For example, the intention for acceleration judgment unit 52 judges that the intention for acceleration by the driver is absent in the case where an acceleration pedal is not stepped on. When the regenerative control unit 53 judges that the regeneration is to be started, it proceeds to the step S63. Also, when the regenerative control unit 53 judges that the regeneration is not to be started, it starts the processing again from the step S61 described above.

At the step S63, the regenerative control unit 53 carries out the regenerative control by controlling the driving motor 2 and the inverter 4. By means of this, the power generation by the driving motor 2 is carried out, and the battery pack 30 is charged by the power from the driving motor 2.

Next, at the step S64, the charging switch control unit 51 turns the charging switch 41 ON.

Next, at the step S65, the regenerative control unit 53 judges whether the regeneration is to be finished or not. To be concrete, the regenerative control unit 53 judges that the regeneration is to be finished, when the intention for acceleration judgment unit 52 judges that the intention for acceleration of the motor vehicle by the driver is present. For example, the intention for acceleration judgment unit 52 judges that the intention for acceleration by the driver is present in the case where an acceleration pedal is stepped on. When the regenerative control unit 53 judges that the regeneration is to be finished, it starts the processing again from the step S61 described above. Also, when the regenerative control unit 53 judges that the regeneration is not to be finished, it starts the processing again from the step S63 described above.

(Operations, Effects and the Like)

Next, one example of a series of operations of the battery controller 60 and the motor vehicle controller 50, and their effects and the like will be described.

First, when the motor vehicle key is operated by the driver and it becomes the READY state, the battery controller 60 starts the charging of the lead battery 5 by the battery pack 30 by turning the charging switch 41 ON (step S1 described above, the step S2 described above, and the step S22 described above). Then, in the case where the voltage of the lead battery 5 is greater than the first voltage judgment threshold (for example, 12.4V), the battery controller 60 carries out the charging until the lead battery 5 becomes fully charged, and turns the charging switch 41 OFF when it becomes fully charged (the step S23 to the step S25 described above). Then, if the voltage of the lead battery 5 is greater than the second voltage judgment threshold (for example, 12.2V), the battery controller 60 keeps the charging switch 41 OFF (from the step S26 described above to the step S25 described above). Namely, the battery controller 60 maintains a state of not charging the lead battery 5. On the other hand, when the voltage of the lead battery 5 becomes less than or equal to the second voltage judgment threshold (for example, 12.2V), the battery controller 60 starts the charging of the lead battery 5 by turning the charging switch 41 ON (from the step S26 described above to the step S22 described above).

Also, in the case where the voltage of the lead battery 5 is less than or equal to the first voltage judgment threshold (for example, 12.4V), the battery controller 60 charges the battery pack 30 (from the step S23 described above to the step S43 described above). This is because the case where the voltage of the lead battery 5, i.e., the voltage detected by the battery voltage sensor 6 is less than or equal to the first voltage judgment threshold implies that the voltage of the battery pack 30 is also lowering, so that the battery controller 60 charges the battery pack 30 by driving the engine 3.

Also, at this point, the output voltage from the inverter 4 is preferably 13.0V×the number of battery modules (i.e., the number of battery modules 31 that are connected in series) to 14.5V×the number of battery modules. At this point, the output voltage from the inverter 4 needs to be a value that can charge the lead battery 5 as well, besides a value that can charge the battery pack 30.

Then, in the case where the battery pack SOC of the battery pack 30 for which the charging is carried out becomes greater than the charging finish value (for example, 80% in terms of the SOC value), the battery controller 60 stops the engine 3 (that is, finishes the changing of the battery pack 30), and turns the charging switch 41 OFF (the step S44 described above to the step S46 described above).

Also, in the case where the battery pack SOC is less than or equal to the lower limit value (for example, 30% in terms of the SOC value), the battery controller 60 also charges the battery pack 30 by driving the engine 3 (the step S41 described above to the step S43 described above). Then, in the case where the battery pack SOC of the battery pack 30 for which the charging is carried out becomes greater than the charging finish value (for example, 80% in terms of the SOC value), the battery controller 60 stops the engine 3 (that is, finishes the changing of the battery pack 30), and turns the charging switch 41 OFF (the step S44 described above to the step S46 described above).

Also, at a time of the regenerative control, the motor vehicle controller 50 judges whether the regeneration is to be started or not, after turning the charging switch 41 OFF (the step S61 described above, the step S62 described above). In other words, the motor vehicle controller 50 keeps the charging switch 41 OFF at a time of the stable running before the regeneration, and judges whether the regeneration is to be started or not in that state. Then, when it is judged that the regeneration is to be started, the motor vehicle controller 50 carries out the regenerative control by controlling the driving motor 2 and the inverter 4, while turning the charging switch 41 ON at the same time (the step S63 described above, the step S64 described above). By means of this, the battery pack 30 is charged by the electric energy converted from the braking energy.

Here, the reason for carrying out the regenerative control while turning the charging switch 41 ON at the same time is to increase the charge acceptance amount by making it possible to charge the lead battery 5 along with the battery pack 30.

Also, the output voltage from the inverter 4 at a time of the regenerative control is preferably 14.0V×the number of battery modules to 15.5V×the number of battery modules. The reason for making the output voltage from the inverter 4 at a time of the regeneration larger than the output voltage from the inverter 4 at a time of the normal running (at a time of the control of FIG. 4 to FIG. 6) in this way is to carry out the charging by the regeneration efficiently by making the output voltage from the inverter 4 larger, because the charging by the regeneration is carried out in a shorter period of time than the charging at a time of the normal running.

As described above, according to the battery charging device for the motor vehicle of the present embodiment, the plurality of battery modules 31 within the battery pack 30 have an output equivalent to the lead battery (the low voltage battery) 5, and these are connected in parallel, and further the plurality of battery modules 31 and the lead battery (the low voltage battery) 5 are connected in parallel. By means of this, the battery charging device for the motor vehicle of the present embodiment can charge the lead battery (the low voltage battery) 5 by utilizing the battery modules 31 within the battery pack 30, without using a transformer such as a DC/DC converter. Consequently, a space for arranging the DC/DC converter becomes unnecessary, and there is no need to secure an arrangement space for accessories and the like for cooling the DC/DC converter.

Also, according to the battery charging device for the motor vehicle of the present embodiment, by making the currents to flow from the battery modules 31 toward the lead battery (the low voltage battery) 5 in one direction by providing the diodes 36 in the parallel circuit (the low voltage circuit) 39, it is possible to charge the lead battery (the low voltage battery) 5 by utilizing the power of the battery modules 31. Also, it is possible to prevent a voltage dropping or an excessive discharging of the lead battery (the low voltage battery) 5 by preventing the charging of the battery modules 31 by the lead battery (the low voltage battery) 5.

Furthermore, the battery charging device for the motor vehicle of the present embodiment can charge the lead battery (the low voltage battery) 5 by using the power of the battery pack 30 until it becomes fully charged. Also, the voltage value of the battery pack 30 can be detected by the lead battery voltage detection unit (the voltage detection unit) 61, so that it is possible to charge the lead battery (the low voltage battery) 5 according to that voltage value of the battery pack 30.

Also, in the case where there is a need to charge the lead battery (the low voltage battery) 5 or the battery pack 30, the battery charging device for the motor vehicle of the present embodiment can charge the lead battery (the low voltage battery) 5 or the battery pack 30 by driving the engine 3.

Also, the battery charging device for the motor vehicle of the present embodiment can charge the lead battery (the low voltage battery) 5 or the battery pack 30 by the regenerative power of the driving motor 2 in the case where the intention for acceleration by the driver is absent.

(Modified Examples and the Like of the Present Embodiment)

In the present embodiment, the battery pack 30 is not limited to be mounted on the motor vehicle in the configuration mentioned above, as long as it is the motor vehicle equipped with the low voltage battery as well. For example, the battery pack 30 may be used as the battery for the regeneration of the motor vehicle having an idling stop function that temporarily stops the engine 3, or it may be used as the power source of the electric motor vehicle that is not equipped with the engine 3.

Also, in the present embodiment, the processing shown in FIG. 4 to FIG. 6 is carried out by the battery controller 60, and the processing shown in FIG. 9 is carried out by the motor vehicle controller 50. However, the present invention is not limited to this. For example, the processing shown in FIG. 9 may be carried out by the battery controller 60.

Also, in the present embodiment, the voltage value of the low voltage battery is not limited to 12V, as long as it is lower than the voltage value of the battery pack 30 (the high voltage battery).

Also, the embodiment of the present invention has been described concretely, but the scope of the present invention is not to be limited to the exemplary embodiment shown in the figures and described, and contains all the embodiments that can bring about the effects equivalent to those aimed by the present invention. Furthermore, the scope of the present invention is not to be limited to a combination of features of the invention as specified by the claim 1, and can be specified by any desired combinations of specific features among all the respective features disclosed.

The invention claimed is:

1. A battery charging device for a motor vehicle that controls a charging of a low voltage battery, comprising:
   a low voltage battery that is a power source of low voltage system equipments,
   a driving motor that drives driving wheels, and
   a battery pack that is a power source of said driving motor, which has a plurality of battery modules having an output equivalent to said low voltage battery, a low voltage circuit for connecting said plurality of battery modules in parallel, and a high voltage circuit for connecting said plurality of battery modules in series,
   wherein said low voltage battery is connected to the low voltage circuit in parallel with said plurality of battery modules.

2. The battery charging device for the motor vehicle as recited in claim 1, wherein said low voltage circuit has elements for flowing currents in one direction from said battery modules toward said low voltage battery.

3. The battery charging device for the motor vehicle as recited in claim 2, further comprising a voltage detection unit for detecting a voltage on said low voltage circuit, and a charging control unit for carrying out the charging of said low voltage battery by using a power of said battery pack, when a voltage value detected by said voltage detection unit is greater than a voltage judgment threshold that is set in advance.

4. The battery charging device for the motor vehicle as recited in claim 3, further comprising an engine for carrying out a power generation by driving said driving motor, and a SOC calculation unit for calculating a SOC (State Of Charge) of said battery pack,
   wherein said charging control unit charges at least one of said low voltage battery and said battery pack by a power generated by said engine, when the voltage value detected by said voltage detection unit is less than or equal to said voltage judgment threshold, or the SOC calculated by said SOC calculation unit is less than a SOC judgment threshold that is set in advance.

5. The battery charging device for the motor vehicle as recited in claim 4, further comprising an intention for acceleration judgment unit for judging an intention for acceleration of said motor vehicle by a driver,
   wherein said charging control unit charges at least one of said low voltage battery and said battery pack by a regenerative power of said driving motor, when said intention for acceleration judgment unit judges that said intention for acceleration is absent.

6. The battery charging device for the motor vehicle as recited in claim 3, further comprising an intention for acceleration judgment unit for judging an intention for acceleration of said motor vehicle by a driver,
   wherein said charging control unit charges at least one of said low voltage battery and said battery pack by a regenerative power of said driving motor, when said intention for acceleration judgment unit judges that said intention for acceleration is absent.

7. The battery charging device for the motor vehicle as recited in claim 1, further comprising a voltage detection unit for detecting a voltage on said low voltage circuit, and a charging control unit for carrying out the charging of said low voltage battery by using a power of said battery pack, when a voltage value detected by said voltage detection unit is greater than a voltage judgment threshold that is set in advance.

8. The battery charging device for the motor vehicle as recited in claim 7, further comprising an engine for carrying out a power generation by driving said driving motor, and a SOC calculation unit for calculating a SOC (State Of Charge) of said battery pack,
   wherein said charging control unit charges at least one of said low voltage battery and said battery pack by a power generated by said engine, when the voltage value detected by said voltage detection unit is less than or equal to said voltage judgment threshold, or the SOC calculated by said SOC calculation unit is less than a SOC judgment threshold that is set in advance.

9. The battery charging device for the motor vehicle as recited in claim 8, further comprising an intention for acceleration judgment unit for judging an intention for acceleration of said motor vehicle by a driver,
   wherein said charging control unit charges at least one of said low voltage battery and said battery pack by a regenerative power of said driving motor, when said intention for acceleration judgment unit judges that said intention for acceleration is absent.

10. The battery charging device for the motor vehicle as recited in claim 7, further comprising an intention for acceleration judgment unit for judging an intention for acceleration of said motor vehicle by a driver,
    wherein said charging control unit charges at least one of said low voltage battery and said battery pack by a regenerative power of said driving motor, when said intention for acceleration judgment unit judges that said intention for acceleration is absent.

* * * * *